US006717991B1

(12) United States Patent
Gustafsson et al.

(10) Patent No.: US 6,717,991 B1
(45) Date of Patent: Apr. 6, 2004

(54) SYSTEM AND METHOD FOR DUAL MICROPHONE SIGNAL NOISE REDUCTION USING SPECTRAL SUBTRACTION

(75) Inventors: Harald Gustafsson, Lund (SE); Ulf Lindgren, Lund (SE); Ingvar Claesson, Dalby (SE); Sven Nordholm, Shelley, WA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/493,265

(22) Filed: Jan. 28, 2000

Related U.S. Application Data

(60) Continuation-in-part of application No. 09/289,065, filed on Apr. 12, 1999, now Pat. No. 6,549,586, which is a division of application No. 09/084,387, filed on May 27, 1998, now Pat. No. 6,175,602, which is a division of application No. 09/084,503, filed on May 27, 1998, now Pat. No. 6,459,914.

(51) Int. Cl.[7] .............................................. H04B 15/00

(52) U.S. Cl. ....................... 375/285; 375/346; 704/233; 381/71.1; 455/570

(58) Field of Search ................................ 375/254, 285, 375/346, 348, 349; 704/219, 225, 226, 233; 708/404, 405; 381/71.1, 71.11, 71.12, 94.1, 94.3; 455/63.1, 67.13, 114.2, 296, 303, 570

(56) References Cited

U.S. PATENT DOCUMENTS

| | | | | | |
|---|---|---|---|---|---|
| 4,594,695 | A | | 6/1986 | Garconnat et al. | |
| 5,418,857 | A | * | 5/1995 | Eatwell | 381/71.4 |
| 5,473,701 | A | * | 12/1995 | Cezanne et al. | 381/92 |
| 5,475,761 | A | * | 12/1995 | Eatwell | 381/71.11 |
| 5,668,747 | A | * | 9/1997 | Ohashi | 708/322 |
| 5,680,393 | A | * | 10/1997 | Bourmeyster et al. | 370/286 |
| 5,740,256 | A | * | 4/1998 | Castello Da Costa et al. | 381/94.7 |
| 5,742,927 | A | * | 4/1998 | Crozier et al. | 704/226 |
| 5,903,819 | A | * | 5/1999 | Romesburg | 455/63.1 |

FOREIGN PATENT DOCUMENTS

| | | |
|---|---|---|
| EP | 0 806 759 A2 | 11/1997 |
| FR | 2 768 547 | 3/1999 |
| WO | WO 96/24128 | 8/1996 |

OTHER PUBLICATIONS

Janse et al., Pub. No.: US 2003/0026437 A1, Pub. Date: Feb. 6, 2003.*

(List continued on next page.)

*Primary Examiner*—Young T. Tse
(74) *Attorney, Agent, or Firm*—Burns, Doane, Swecker & Mathis, LLP

(57) ABSTRACT

Speech enhancement is provided in dual microphone noise reduction systems by including spectral subtraction algorithms using linear convolution, causal filtering and/or spectrum dependent exponential averaging of the spectral subtraction gain function. According to exemplary embodiments, when a far-mouth microphone is used in conjunction with a near-mouth microphone, it is possible to handle non-stationary background noise as long as the noise spectrum can continuously be estimated from a single block of input samples. The far-mouth microphone, in addition to picking up the background noise, also picks up the speaker's voice, albeit at a lower level than the near-mouth microphone. To enhance the noise estimate, a spectral subtraction stage is used to suppress the speech in the far-mouth microphone signal. To be able to enhance the noise estimate, a rough speech estimate is formed with another spectral subtraction stage from the near-mouth signal. Finally, a third spectral subtraction function is used to enhance the near-mouth signal by suppressing the background noise using the enhanced background noise estimate. A controller dynamically determines any or all of a first, second, and third subtraction factor for each of the first, second, and third spectral subtraction stages, respectively.

60 Claims, 6 Drawing Sheets

OTHER PUBLICATIONS

S.F. Boll: "Suppression of Acoustic Noise in Speech using Spectral Subtraction", IEEE Trans. Acoust. Speech and Sig. Proc., vol. 27:113–120, 1979.

N. Virage: "Speech Enhancement Based on Masking Properties of the Auditory System", IEEE ICASSP. Proc. 796–799 vol. 1, 1995.

D. Tsoukalas et al.: "Speech Enhancement using Psychoacoustic Criteria", IEEE ICASSP. Proc., 359–362 vol. 2, 1993.

F, Xie et al.: "Speech Enhancement by Spectral Magnitude Estimation—A Unifying Approach", IEEE *Speech Communication,* 89–104 vol. 19, 1996.

R. Martin: "Spectral Subtraction Based on Minimum Statistics", *UESIPCO,* Proc., 1182–1185 vol. 2, 1994.

S.M. McOlash et al.: "A Spectral Subtraction Method for Enhancement of Speech Corrupted by Non–white, Non–stationary Noise", *IEEE IECON.* Proc., 872–877 vol. 2, 1995.

J.G. Proakis et al.: *Digital Signal Processing; Principles, Algorithms, and Applications, Macmillan,* Second Ed., 1992.

Alan V. Oppenheim et al.: *Discrete–Time Signal Processing, Prentice–Hall,* Inter. Ed., 1989.

* cited by examiner

SYSTEM AND METHOD FOR DUAL MICROPHONE SIGNAL NOISE REDUCTION USING SPECTRAL SUBTRACTION

CROSS REFERENCE TO RELATED APPLICATIONS

The present application is a continuation-in-part of U.S. patent application Ser. No. 09/289,065, filed on Apr. 12, 1999, now U.S. Pat. No. 6,549,586, and entitled "System and Method for Dual Microphone Signal Noise Reduction Using Spectral Subtraction," which is a division of U.S. patent application Ser. No. 09/084,387, filed May 27, 1998, now U.S. Pat. No. 6,175,602, and entitled "Signal Noise Reduction by Spectral Subtraction using Linear Convolution and Causal Filtering," which is a division of U.S. patent application Ser. No. 09/084,503, also filed May 27, 1998, now U.S. Pat. No. 6,459,914, and entitled "Signal Noise Reduction by Spectral Subtraction using Spectrum Dependent Exponential Gain Function Averaging." Each of the above cited patent applications is incorporated herein by reference in its entirety.

BACKGROUND

The present invention relates to communications systems, and more particularly, to methods and apparatus for mitigating the effects of disruptive background noise components in communications signals.

Today, technology and consumer demand have produced mobile telephones of diminishing size. As the mobile telephones are produced smaller and smaller, the placement of the microphone during use ends up more and more distant from the speaker's (near-end user's) mouth. This increased distance increases the need for speech enhancement due to disruptive background noise being picked up at the microphone and transmitted to a far-end user. In other words, since the distance between a microphone and a near-end user is larger in the newer smaller mobile telephones, the microphone picks up not only the near-end user's speech, but also any noise which happens to be present at the near-end location. For example, the near-end microphone typically picks up sounds such as surrounding traffic, road and passenger compartment noise, room noise, and the like. The resulting noisy near-end speech can be annoying or even intolerable for the far-end user. It is thus desirable that the background noise be reduced as much as possible, preferably early in the near-end signal processing chain (e.g., before the received near-end microphone signal is supplied to a near-end speech coder).

As a result of interfering background noise, some telephone systems include a noise reduction processor designed to eliminate background noise at the input of a near-end signal processing chain. FIG. 1 is a high-level block diagram of such a system 100. In FIG. 1, a noise reduction processor 110 is positioned at the output of a microphone 120 and at the input of a near-end signal processing path (not shown). In operation, the noise reduction processor 110 receives a noisy speech signal x from the microphone 120 and processes the noisy speech signal x to provide a cleaner, noise-reduced speech signal $S_{NR}$ which is passed through the near-end signal processing chain and ultimately to the far-end user.

One well known method for implementing the noise reduction processor 110 of FIG. 1 is referred to in the art as spectral subtraction. See, for example, S. F. Boll, "Suppression of Acoustic Noise in Speech using Spectral Subtraction", *IEEE Trans. Acoust. Speech and Sig. Proc.,* 27:113–120, 1979, which is incorporated herein by reference in its entirety. Generally, spectral subtraction uses estimates of the noise spectrum and the noisy speech spectrum to form a signal-to-noise ratio (SNR) based gain function which is multiplied by the input spectrum to suppress frequencies having a low SNR. Though spectral subtraction does provide significant noise reduction, it suffers from several well known disadvantages. For example, the spectral subtraction output signal typically contains artifacts known in the art as musical tones. Further, discontinuities between processed signal blocks often lead to diminished speech quality from the far-end user perspective.

Many enhancements to the basic spectral subtraction method have been developed in recent years. See, for example, N. Virage, "Speech Enhancement Based on Masking Properties of the Auditory System," *IEEE ICASSP. Proc.* 796–799 vol. 1, 1995; D. Tsoukalas, M. Paraskevas and J. Mourjopoulos, "Speech Enhancement using Psychoacoustic Criteria," *IEEE ICASSP. Proc.,* 359–362 vol. 2, 1993; F. Xie and D. Van Compernolle, "Speech Enhancement by Spectral Magnitude Estimation—A Unifying Approach," *IEEE Speech Communication,* 89–104 vol. 19, 1996; R. Martin, "Spectral Subtraction Based on Minimum Statistics," *UESIPCO, Proc.,* 1182–1185 vol. 2, 1994; and S. M. McOlash, R. J. Niederjohn and J. A. Heinen, "A Spectral Subtraction Method for Enhancement of Speech Corrupted by Nonwhite, Nonstationary Noise," *IEEE IECON. Proc.,* 872–877 vol. 2, 1995.

More recently, spectral subtraction has been implemented using correct convolution and spectrum dependent exponential gain function averaging. These techniques are described in co-pending U.S. patent application Ser. No. 09/084,387, filed May 27, 1998 and entitled "Signal Noise Reduction by Spectral Subtraction using Linear Convolution and Causal Filtering" and co-pending U.S. patent application Ser. No. 09/084,503, also filed May 27, 1998 and entitled "Signal Noise Reduction by Spectral Subtraction using Spectrum Dependent Exponential Gain Function Averaging."

Spectral subtraction uses two spectrum estimates, one being the "disturbed" signal and one being the "disturbing" signal, to form a signal-to-noise ratio (SNR) based gain function. The disturbed spectra is multiplied by the gain function to increase the SNR for this spectra. In single microphone spectral subtraction applications, such as used in conjunction with hands-free telephones, speech is enhanced from the disturbing background noise. The noise is estimated during speech pauses or with the help of a noise model during speech. This implies that the noise must be stationary to have similar properties during the speech or that the model be suitable for the moving background noise. Unfortunately, this is not the case for most background noises in every-day surroundings.

Therefore, there is a need for a noise reduction system which uses the techniques of spectral subtraction and which is suitable for use with most every-day variable background noises.

SUMMARY

The present invention fulfills the above-described and other needs by providing methods and apparatus for performing noise reduction by spectral subtraction in a dual microphone system. According to exemplary embodiments, when a far-mouth microphone is used in conjunction with a near-mouth microphone, it is possible to handle non-stationary background noise as long as the noise spectrum can continuously be estimated from a single block of input samples. The far-mouth microphone, in addition to picking up the background noise, also picks us the speaker's voice, albeit at a lower level than the near-mouth microphone. To enhance the noise estimate, a spectral subtraction stage is used to suppress the speech in the far-mouth microphone signal. To be able to enhance the noise estimate, a rough speech estimate is formed with another spectral subtraction stage from the near-mouth signal. Finally, a third spectral subtraction stage is used to enhance the near-mouth signal by suppressing the background noise using the enhanced background noise estimate. A controller dynamically determines any or all of a first, second, and third subtraction factor for each of the first, second, and third spectral subtraction stages, respectively.

The above-described and other features and advantages of the present invention are explained in detail hereinafter with reference to the illustrative examples shown in the accompanying drawings. Those skilled in the art will appreciate that the described embodiments are provided for purposes of illustration and understanding and that numerous equivalent embodiments are contemplated herein.

DETAILED DESCRIPTION

To understand the various features and advantages of the present invention, it is useful to first consider a conventional spectral subtraction technique. Generally, spectral subtraction is built upon the assumption that the noise signal and the speech signal in a communications application are random, uncorrelated and added together to form the noisy speech signal. For example, if s(n), w(n) and x(n) are stochastic short-time stationary processes representing speech, noise and noisy speech, respectively, then:

$$x(n)=s(n)+w(n) \tag{1}$$

$$R_x(f)=R_s(f)+R_w(f) \tag{2}$$

where R(f) denotes the power spectral density of a random process.

The noise power spectral density $R_w(f)$ can be estimated during speech pauses (i.e., where x(n)=w(n)). To estimate the power spectral density of the speech, an estimate is formed as:

$$\hat{R}_s(f)=\hat{R}_x(f)-\hat{R}_w(f) \tag{3}$$

The conventional way to estimate the power spectral density is to use a periodogram. For example, if $X_N(f_u)$ is the N length Fourier transform of x(n) and $W_N(f_u)$ is the corresponding Fourier transform of w(n), then:

$$\hat{R}_x(f_u)=P_{x,N}(f_u)=\frac{1}{N}|X_N(f_u)|^2,\quad f_u=\frac{u}{N},\, u=0,\ldots,N-1 \tag{4}$$

$$\hat{R}_w(f_u)=P_{w,N}(f_u)=\frac{1}{N}|W_N(f_u)|^2,\quad f_u=\frac{u}{N},\, u=0,\ldots,N-1 \tag{5}$$

Equations (3), (4) and (5) can be combined to provide:

$$|S_N(f_u)|^2=|X_N(f_u)|^2-|W_N(f_u)|^2 \tag{6}$$

Alternatively, a more general form is given by:

$$|S_N(f_u)|^a 32\ |X_N(f_u)|^a-51\ W_N(f_u)|^a \tag{7}$$

where the power spectral density is exchanged for a general form of spectral density.

Since the human ear is not sensitive to phase errors of the speech, the noisy speech phase $\phi_x(f)$ can be used as an approximation to the clean speech phase $\phi_s(f)$:

$$\phi_s(f_u)=\phi_x(f_u) \tag{8}$$

A general expression for estimating the clean speech Fourier transform is thus formed as:

$$S_N(f_u)=(|X_N(f_u)|^a-k\cdot|W_N(f_u)|^a)^{1/a}\cdot e^{j\phi_x(f_u)} \tag{9}$$

where a parameter k is introduced to control the amount of noise subtraction.

In order to simplify the notation, a vector form is introduced:

$$X_N=\begin{pmatrix} X_N(f_0) \\ X_N(f_1) \\ \vdots \\ X_N(f_{N-1}) \end{pmatrix} \tag{10}$$

The vectors are computed element by element. For clarity, element by element multiplication of vectors is denoted herein by $\odot$. Thus, equation (9) can be written employing a gain function $G_N$ and using vector notation as:

$$S_N=G_N\odot|X_N|\odot e^{j\phi_x}=G_N\odot X_{NN} \tag{11}$$

where the gain function is given by:

$$G_N=\left(\frac{|X_N|^a-k\cdot|W_N|^a}{|X_N|^a}\right)^{\frac{1}{a}}=\left(1-k\cdot\frac{|W_N|^a}{|X_N|^a}\right)^{\frac{1}{a}} \tag{12}$$

Figure 1:
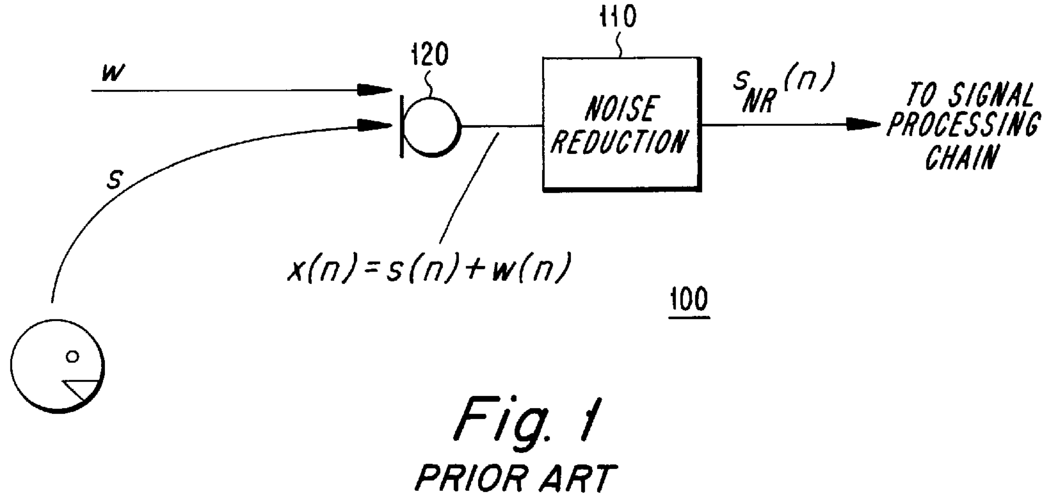
Fig. 1 PRIOR ART
FIG. 1 is a block diagram of a noise reduction system in which spectral subtraction can be implemented.
Figure 2:
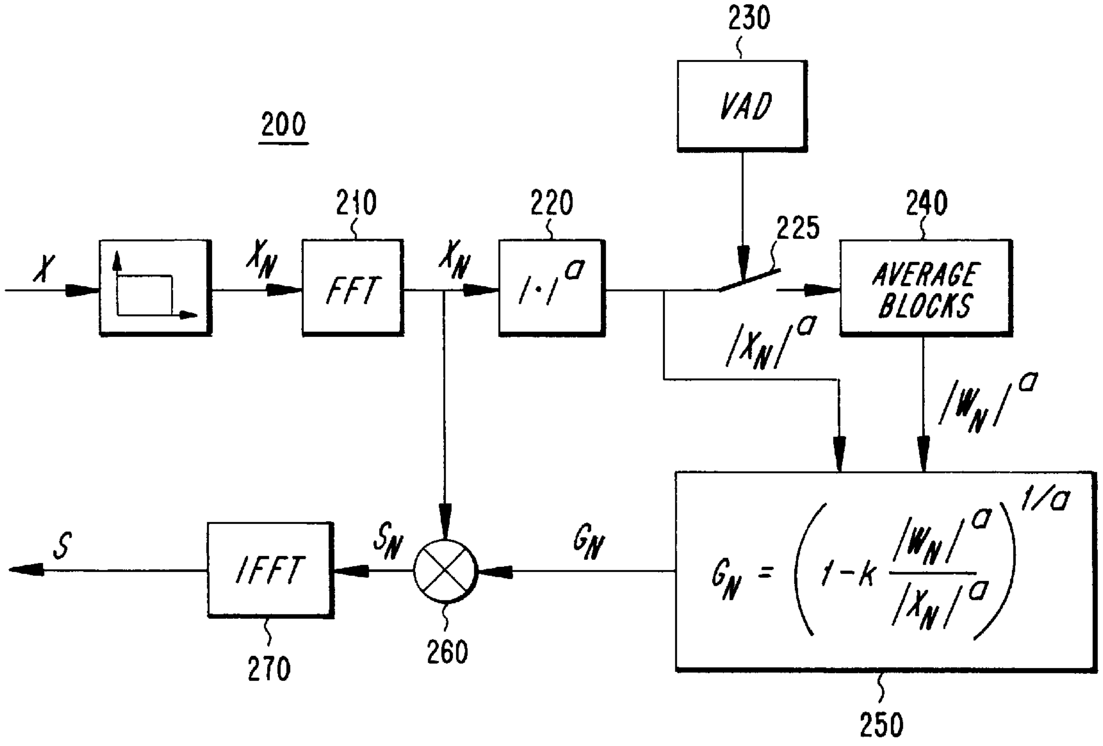
Fig. 2 PRIOR ART
FIG. 2 depicts a conventional spectral subtraction noise reduction processor.

Equation (12) represents the conventional spectral subtraction algorithm and is illustrated in FIG. 2. In FIG. 2, a conventional spectral subtraction noise reduction processor 200 includes a fast Fourier transform processor 210, a magnitude squared processor 220, a voice activity detector 230, a block-wise averaging device 240, a block-wise gain computation processor 250, a multiplier 260 and an inverse fast Fourier transform processor 270.

As shown, a noisy speech input signal is coupled to an input of the fast Fourier transform processor 210, and an output of the fast Fourier transform processor 210 is coupled to an input of the magnitude squared processor 220 and to a first input of the multiplier 260. An output of the magnitude squared processor 220 is coupled to a first contact of the switch 225 and to a first input of the gain computation processor 250. An output of the voice activity detector 230 is coupled to a throw input of the switch 225, and a second contact of the switch 225 is coupled to an input of the block-wise averaging device 240. An output of the block-wise averaging device 240 is coupled to a second input of the gain computation processor 250, and an output of the gain computation processor 250 is coupled to a second input of the multiplier 260. An output of the multiplier 260 is coupled to an input of the inverse fast Fourier transform processor 270, and an output of the inverse fast Fourier transform processor 270 provides an output for the conventional spectral subtraction system 200.

In operation, the conventional spectral subtraction system 200 processes the incoming noisy speech signal, using the conventional spectral subtraction algorithm described above, to provide the cleaner, reduced-noise speech signal. In practice, the various components of FIG. 2 can be implemented using any known digital signal processing technology, including a general purpose computer, a collection of integrated circuits and/or application specific integrated circuitry (ASIC).

Note that in the conventional spectral subtraction algorithm, there are two parameters, a and k, which control the amount of noise subtraction and speech quality. Setting the first parameter to a=2 provides a power spectral subtraction, while setting the first parameter to a=1 provides magnitude spectral subtraction. Additionally, setting the first parameter to a=0.5 yields an increase in the noise reduction while only moderately distorting the speech. This is due to the fact that the spectra are compressed before the noise is subtracted from the noisy speech.

The second parameter k is adjusted so that the desired noise reduction is achieved. For example, if a larger k is chosen, the speech distortion increases. In practice, the parameter k is typically set depending upon how the first parameter a is chosen. A decrease in a typically leads to a decrease in the k parameter as well in order to keep the speech distortion low. In the case of power spectral subtraction, it is common to use over-subtraction (i.e., k>1).

The conventional spectral subtraction gain function (see equation (12)) is derived from a full block estimate and has zero phase. As a result, the corresponding impulse response $g_N(u)$ is non-causal and has length N (equal to the block length). Therefore, the multiplication of the gain function $G_N(l)$ and the input signal $X_N$ (see equation (11)) results in a periodic circular convolution with a non-causal filter. As described above, periodic circular convolution can lead to undesirable aliasing in the time domain, and the non-causal nature of the filter can lead to discontinuities between blocks and thus to inferior speech quality. Advantageously, the present invention provides methods and apparatuses for providing correct convolution with a causal gain filter and thereby eliminates the above described problems of time domain aliasing and inter-block discontinuity.

With respect to the timedomain aliasing problem, note that convolution in the time-domain corresponds to multiplication in the frequency-domain. In other words:

$$x(u)*y(u)\leftarrow X(f)\cdot Y(f),\ u=-\infty, \ldots, \infty \tag{13}$$

When the transformation is obtained from a fast Fourier transform (FFT) of length N, the result of the multiplication is not a correct convolution. Rather, the result is a circular convolution with a periodicity of N:

$$x_N \circledN y_N \tag{14}$$

where the symbol Ⓝ denotes circular convolution.

In order to obtain a correct convolution when using a fast Fourier transform, the accumulated order of the impulse responses $x_N$ and $y_N$ must be less than or equal to one less than the block length N−1.

Thus, the time domain aliasing problem resulting from periodic circular convolution can be solved by using a gain function $G_N(l)$ and an input signal block $X_N$ having a total order less than or equal to N−1.

According to conventional spectral subtraction, the spectrum $X_N$ of the input signal is of full block length N. However, according to the invention, an input signal block $X_L$ of length L (L<N) is used to construct a spectrum of order L. The length L is called the frame length and thus $x_L$ is one frame. Since the spectrum which is multiplied with the gain function of length N should also be of length N, the frame $X_L$ is zero padded to the full block length N, resulting in $X_{L\uparrow N}$.

In order to construct a gain function of length N, the gain function according to the invention can be interpolated from a gain function $G_M(l)$ of length M, where M<N, to form $G_{M\uparrow N}(l)$. To derive the low order gain function $G_{M\uparrow N}(l)$ according to the invention, any known or yet to be developed spectrum estimation technique can be used as an alternative to the above described simple Fourier transform periodogram. Several known spectrum estimation techniques provide lower variance in the resulting gain function. See, for example, J. G. Proakis and D. G. Manolakis, *Digital Signal Processing; Principles, Algorithms, and Applications, Macmillan,* Second Ed., 1992.

According to the well known Bartlett method, for example, the block of length N is divided into K sub-blocks of length M. A periodogram for each sub-block is then computed and the results are averaged to provide an M-long periodogram for the total block as:

$$\begin{aligned} P_{x,M}(f_u) &= \frac{1}{K}\sum_{k=0}^{K-1} P_{x,M,k}(f_u),\quad f_u = \frac{u}{M},\quad u = 0, \ldots, M-1 \\ &= \frac{1}{K}\sum_{k=0}^{K-1} |\mathcal{F}(x(k\cdot M + u))|^2 \end{aligned} \tag{15}$$

Advantageously, the variance is reduced by a factor K when the sub-blocks are uncorrelated, compared to the full block length periodogram. The frequency resolution is also reduced by the same factor.

Alternatively, the Welch method can be used. The Welch method is similar to the Bartlett method except that each sub-block is windowed by a Hanning window, and the sub-blocks are allowed to overlap each other, resulting in more sub-blocks. The variance provided by the Welch method is further reduced as compared to the Bartlett method. The Bartlett and Welch methods are but two spectral estimation techniques, and other known spectral estimation techniques can be used as well.

Irrespective of the precise spectral estimation technique implemented, it is possible and desirable to decrease the variance of the noise periodogram estimate even further by using averaging techniques. For example, under the assumption that the noise is long-time stationary, it is possible to average the periodograms resulting from the above described Bartlett and Welch methods. One technique employs exponential averaging as:

$$\overline{P}_{x,M}(l)=\alpha\cdot\overline{P}_{x,M}(l-1)+(1-\alpha)\cdot P_{x,M}(l) \tag{16}$$

In equation (16), the function $P_{x,M}(l)$ is computed using the Bartlett or Welch method, the function $\overline{P}$x,M(l) is the exponential average for the current block and the function $\overline{P}_{x,M}$ (l−1) is the exponential average for the previous block. The parameter α controls how long the exponential memory is, and typically should not exceed the length of how long the noise can be considered stationary. An $\alpha$ closer to 1 results in a longer exponential memory and a substantial reduction of the periodogram variance.

The length M, is referred to as the sub-block length, and the resulting low order gain function has an impulse response of length M. Thus, the noise periodogram estimate $\overline{P}_{x_l,M}(l)$ and the noisy speech periodogram estimate $P_{x_L,M}(l)$ employed in the composition of the gain function are also of length M:

$$G_M(l) = \left(1 - k \cdot \frac{\overline{P}^a_{x_L,M}(l)}{P^a_{x_L,M}(l)}\right)^{\frac{1}{a}} \tag{17}$$

According to the invention, this is achieved by using a shorter periodogram estimate from the input frame $X_L$ and averaging using, for example, the Bartlett method. The Bartlett method (or other suitable estimation method) decreases the variance of the estimated periodogram, and there is also a reduction in frequency resolution. The reduction of the resolution from L frequency bins to M bins means that the periodogram estimate $P_{x_L,M}(l)$ is also of length M. Additionally, the variance of the noise periodogram estimate $\overline{P}_{x_L,M}(l)$ can be decreased further using exponential averaging as described above.

To meet the requirement of a total order less than or equal to N−1, the frame length L, added to the sub-block length M, is made less than N. As a result, it is possible to form the desired output block as:

$$S_N = G_{M\uparrow N}(l) \odot X_{L\uparrow N} \tag{18}$$

Advantageously, the low order filter according to the invention also provides an opportunity to address the problems created by the non-causal nature of the gain filter in the conventional spectral subtraction algorithm (i.e., inter-block discontinuity and diminished speech quality). Specifically, according to the invention, a phase can be added to the gain function to provide a causal filter. According to exemplary embodiments, the phase can be constructed from a magnitude function and can be either linear phase or minimum phase as desired.

To construct a linear phase filter according to the invention, first observe that if the block length of the FFT is of length M, then a circular shift in the time-domain is a multiplication with a phase function in the frequency-domain:

$$g(n-l)_M \leftrightarrow G_M(f_u) \cdot e^{-j2\pi ul/M},\ f_u = \frac{u}{M},\ u = 0, \ldots, M-1 \tag{19}$$

In the instant case, l equals M/2+1, since the first position in the impulse response should have zero delay (i.e., a causal filter). Therefore:

$$g(n-(M/2+1))_M \leftrightarrow G_M(f_u) \cdot e^{-j\pi u\left(1+\frac{2}{M}\right)} \tag{20}$$

and the linear phase filter $\overline{G}_M(f_u)$ is thus obtained as $$\overline{G}_M(f_u) = G_M(f_u) \cdot e^{-j\pi u(l-2/M)} \tag{21}$$

According to the invention, the gain function is also interpolated to a length N, which is done, for example, using a smooth interpolation. The phase that is added to the gain function is changed accordingly, resulting in:

$$\overline{G}_{M\uparrow N}(f_u) = G_{m\uparrow N}(f_u) \cdot e^{-j\pi u(l+2/M)\cdot M/N} \tag{22}$$

Advantageously, construction of the linear phase filter can also be performed in the time-domain. In such case, the gain function $G_M(f_u)$ is transformed to the time-domain using an IFFT, where the circular shift is done. The shifted impulse response is zero-padded to a length N, and then transformed back using an N-long FFT. This leads to an interpolated causal linear phase filter $\overline{G}_{M\uparrow N}(f_u)$ as desired.

A causal minimum phase filter according to the invention can be constructed from the gain function by employing a Hilbert transform relation. See, for example, A. V. Oppenheim and R. W. Schafer, *Discrete-Time Signal Processing,* Prentic-Hall, Inter. Ed., 1989. The Hilbert transform relation implies a unique relationship between real and imaginary parts of a complex function. Advantageously, this can also be utilized for a relationship between magnitude and phase, when the logarithm of the complex signal is used, as:

$$\ln(|G_M(f_u)| \cdot e^{j\cdot arg(G_M(f_u))}) = \ln(|G_M(f_u)|) + \ln(e^{j\cdot arg(G_M(f_u))}) = \ln(|G_M(f_u)|) + j\cdot \arg(G_M(f_u)) \tag{23}$$

In the present context, the phase is zero, resulting in a real function. The function $\ln(|G_M(f_u)|)$ is transformed to the time-domain employing an IFFT of length M, forming $g_M(n)$. The time-domain function is rearranged as:

$$\overline{g}_M(n) = \begin{cases} 2 \cdot g_M(n), & n = 1, 2, \ldots, M/2-1 \\ g_M(n), & n = 0, M/2 \\ 0, & n = M/2+1, \ldots, M-1 \end{cases} \tag{24}$$

The function $\overline{g}_M(n)$ is transformed back to the frequency-domain using an M-long FFT, yielding $\ln(|\overline{G}_M(f_u)| * e^{j\cdot arg(\overline{G}_M(f_u))})$. From this, the function $\overline{G}_M(f_u)$ is formed. The causal minimum phase filter $\overline{G}_M(f_u)$ is then interpolated to a length N. The interpolation is made the same way as in the linear phase case described above. The resulting interpolated filter $G_{M\uparrow N}(f_u)$ is causal and has approximately minimum phase.

Figure 3:
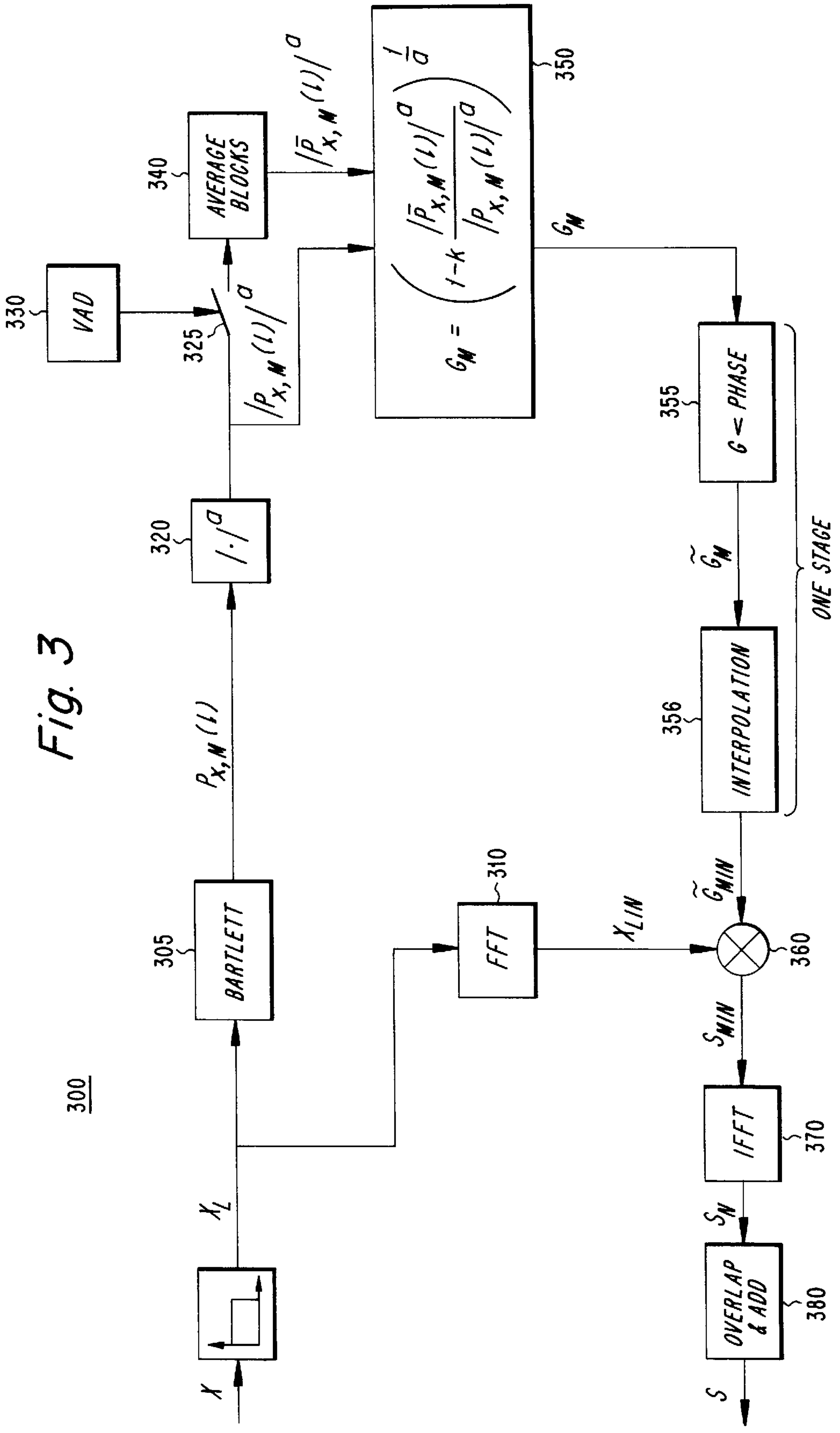
FIGS. 3–4 depict exemplary spectral subtraction noise reduction processors according to exemplary embodiments of the invention.

The above described spectral subtraction scheme according to the invention is depicted in FIG. 3. In FIG. 3, a spectral subtraction noise reduction processor 300, providing linear convolution and causal-filtering, is shown to include a Bartlett processor 305, a magnitude squared processor 320, a voice activity detector 330, a block-wise averaging processor 340, a low order gain computation processor 350, a gain phase processor 355, an interpolation processor 356, a multiplier 360, an inverse fast Fourier transform processor 370 and an overlap and add processor 380.

As shown, the noisy speech input signal is coupled to an input of the Bartlett processor 305 and to an input of the fast Fourier transform processor 310. An output of the Bartlett processor 305 is coupled to an input of the magnitude squared processor 320, and an output of the fast Fourier transform processor 310 is coupled to a first input of the multiplier 360. An output of the magnitude squared processor 320 is coupled to a first contact of the switch 325 and to a first input of the low order gain computation processor 350. A control output of the voice activity detector 330 is coupled to a throw input of the switch 325, and a second contact of the switch 325 is coupled to an input of the block-wise averaging device 340.

An output of the block-wise averaging device 340 is coupled to a second input of the low order gain computation processor 350, and an output of the low order gain computation processor 350 is coupled to an input of the gain phase processor 355. An output of the gain phase processor 355 is coupled to an input of the interpolation processor 356, and an output of the interpolation processor 356 is coupled to a second input of the multiplier 360. An output of the multiplier 360 is coupled to an input of the inverse fast Fourier transform processor 370, and an output of the inverse fast Fourier transform processor 370 is coupled to an input of the overlap and add processor 380. An output of the overlap and add processor 380 provides a reduced noise, clean speech output for the exemplary noise reduction processor 300.

In operation, the spectral subtraction noise reduction processor 300 processes the incoming noisy speech signal, using the linear convolution, causal filtering algorithm described above, to provide the clean, reduced-noise speech signal. In practice, the various components of FIG. 3 can be implemented using any known digital signal processing technology, including a general purpose computer, a collection of integrated circuits and/or application specific integrated circuitry (ASIC).

Advantageously, the variance of the gain function $G_M(l)$ of the invention can be decreased still further by way of a controlled exponential gain function averaging scheme according to the invention. According to exemplary embodiments, the averaging is made, dependent upon the discrepancy between the current block spectrum $P_{x,M}(l)$ and the averaged noise spectrum $\overline{P}_{x,M}(l)$. For example, when there is a small discrepancy, long averaging of the gain function $G_M(l)$ can be provided, corresponding to a stationary background noise situation. Conversely, when there is a large discrepancy, short averaging or no averaging of the gain function $G_M(l)$ can be provided, corresponding to situations with speech or highly varying background noise.

In order to handle the transient switch from a speech period to a background noise period, the averaging of the gain function is not increased in direct proportion to decreases in the discrepancy, as doing so introduces an audible shadow voice (since the gain function suited for a speech spectrum would remain for a long period). Instead, the averaging is allowed to increase slowly to provide time for the gain function to adapt to the stationary input.

According to exemplary embodiments, the discrepancy measure between spectra is defined as $$\beta(l) = \frac{\sum_u |P_{x,M,u}(l) - \overline{P}_{x,M,u}(l)|}{\sum_u \overline{P}_{x,M,u}(l)} \tag{25}$$

where $\beta(l)$ is limited by $$\beta(l) \Leftarrow \begin{cases} 1, & \beta(l) > 1 \\ \beta(l), & \beta_{\min} \le \beta(l) \le 1,\ 0 \le \beta_{\min} \ll 1 \\ \beta_{\min}, & \beta(l) < \beta_{\min} \end{cases} \tag{26}$$

and where $\beta(l)=1$ results in no exponential averaging of the gain function, and $\beta(l)=\beta_{min}$ provides the maximum degree of exponential averaging.

The parameter $\overline{\beta}(l)$ is an exponential average of the discrepancy between spectra, described by $$\overline{\beta}(l)=\gamma\cdot\overline{\beta}(l-1)+(1-\gamma)\cdot\beta(l) \tag{27}$$

The parameter $\gamma$ in equation (27) is used to ensure that the gain function adapts to the new level, when a transition from a period with high discrepancy between the spectra to a period with low discrepancy appears. As noted above, this is done to prevent shadow voices. According to the exemplary embodiments, the adaption is finished before the increased exponential averaging of the gain function starts due to the decreased level of $\beta(l)$. Thus:

$$\gamma = \begin{cases} 0, & \overline{\beta}(l-1) < \beta(l) \\ \gamma_c, & \overline{\beta}(l-1) \ge \beta(l),\ 0 < \gamma_c < 1 \end{cases} \tag{28}$$

When the discrepancy $\beta(l)$ increases, the parameter $\overline{\beta}(l)$ follows directly, but when the discrepancy decreases, an exponential average is employed on $\beta(l)$ to form the averaged parameter $\overline{\beta}(l)$. The exponential averaging of the gain function is described by:

$$\overline{G}_M(l)=(1-\overline{\beta}(l)\cdot\overline{G}_M(l-1)+\overline{\beta}(l)\cdot G_M(l) \tag{29}$$

The above equations can be interpreted for different input signal conditions as follows. During noise periods, the variance is reduced. As long as the noise spectra has a steady mean value for each frequency, it can be averaged to decrease the variance. Noise level changes result in a discrepancy between the averaged noise spectrum $\overline{P}_{x,M}(l)$ and the spectrum for the current block $P_{x,M}(l)$ Thus, the controlled exponential averaging method decreases the gain function averaging until the noise level has stabilized at a new level. This behavior enables handling of the noise level changes and gives a decrease in variance during stationary noise periods and prompt response to noise changes. High energy speech often has time-varying spectral peaks. When the spectral peaks from different blocks are averaged, their spectral estimate contains an average of these peaks and thus looks like a broader spectrum, which results in reduced speech quality. Thus, the exponential averaging is kept at a minimum during high energy speech periods. Since the discrepancy between the average noise spectrum $\overline{P}_{x,M}(l)$ and the current high energy speech spectrum $P_{x,M}(l)$ is large, no exponential averaging of the gain function is performed. During lower energy speech periods, the exponential averaging is used with a short memory depending on the discrepancy between the current low-energy speech spectrum and the averaged noise spectrum. The variance reduction is consequently lower for low-energy speech than during background noise periods, and larger compared to high energy speech periods.

Figure 4:
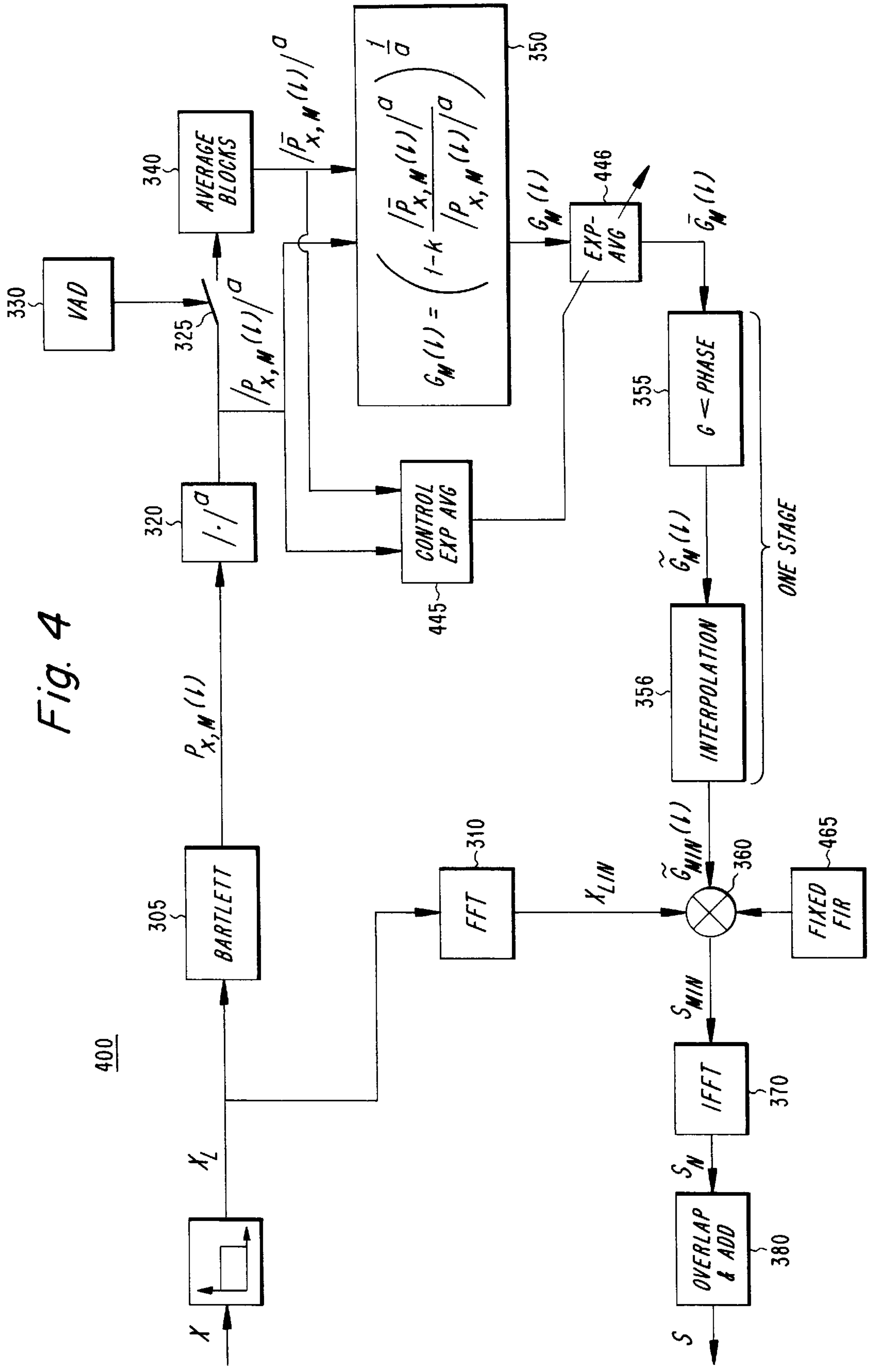

The above described spectral subtraction scheme according to the invention is depicted in FIG. 4. In FIG. 4, a spectral subtraction noise reduction processor 400, providing linear convolution, causal-filtering and controlled exponential averaging, is shown to include the Bartlett processor 305, the magnitude squared processor 320, the voice activity detector 330, the block-wise averaging device 340, the low order gain computation processor 350, the gain phase processor 355, the interpolation processor 356, the multiplier 360, the inverse fast Fourier transform processor 370 and the overlap and add processor 380 of the system 300 of FIG. 3, as well as an averaging control processor 445, an exponential averaging processor 446 and an optional fixed FIR post filter 465.

As shown, the noisy speech input signal is coupled to an input of the Bartlett processor 305 and to an input of the fast Fourier transform processor 310. An output of the Bartlett processor 305 is coupled to an input of the magnitude squared processor 320, and an output of the fast Fourier transform processor 310 is coupled to a first input of the multiplier 360. An output of the magnitude squared processor 320 is coupled to a first contact of the switch 325, to a first input of the low order gain computation processor 350 and to a first input of the averaging control processor 445.

A control output of the voice activity detector 330 is coupled to a throw input of the switch 325, and a second contact of the switch 325 is coupled to an input of the block-wise averaging device 340. An output of the block-wise averaging device 340 is coupled to a second input of the low order gain computation processor 350 and to a second input of the averaging controller 445. An output of the low order gain computation processor 350 is coupled to a signal input of the exponential averaging processor 446, and an output of the averaging controller 445 is coupled to a control input of the exponential averaging processor 446.

An output of the exponential averaging processor 446 is coupled to an input of the gain phase processor 355, and an output of the gain phase processor 355 is coupled to an input of the interpolation processor 356. An output of the interpolation processor 356 is coupled to a second input of the multiplier 360, and an output of the optional fixed FIR post filter 465 is coupled to a third input of the multiplier 360. An output of the multiplier 360 is coupled to an input of the inverse fast Fourier transform processor 370, and an output of the inverse fast Fourier transform processor 370 is coupled to an input of the overlap and add processor 380. An output of the overlap and add processor 380 provides a clean speech signal for the exemplary system 400.

In operation, the spectral subtraction noise reduction processor 400 according to the invention processes the incoming noisy speech signal, using the linear convolution, causal filtering and controlled exponential averaging algorithm described above, to provide the improved, reduced-noise speech signal. As with the embodiment of FIG. 3, the various components of FIG. 4 can be implemented using any known digital signal processing technology, including a general purpose computer, a collection of integrated circuits and/or application specific integrated circuitry (ASIC).

Note that, according to exemplary embodiments, since the sum of the frame length L and the sub-block length M are chosen to be shorter than N−1, the extra fixed FIR filter 465 of length J≦N−1−L−M can be added as shown in FIG. 4. The post filter 465 is applied by multiplying the interpolated impulse response of the filter with the signal spectrum as shown. The interpolation to a length N is performed by zero padding of the filter and employing an N-long FFT. This post filter 465 can be used to filter out the telephone bandwidth or a constant tonal component. Alternatively, the functionality of the post filter 465 can be included directly within the gain function.

The parameters of the above described algorithm are set in practice based upon the particular application in which the algorithm is implemented. By way of example, parameter selection is described hereinafter in the context of a GSM mobile telephone.

First, based on the GSM specification, the frame length L is set to 160 samples, which provides 20 ms frames. Other choices of L can be used in other systems. However, it should be noted that an increment in the frame length L corresponds to an increment in delay. The sub-block length M (e.g., the periodogram length for the Bartlett processor) is made small to provide increased variance reduction M. Since an FFT is used to compute the periodograms, the length M can be set conveniently to a power of two. The frequency resolution is then determined as:

$$B = \frac{F_s}{M} \tag{30}$$

The GSM system sample rate is 8000 Hz. Thus a length M=16, M=32 and M=64 gives a frequency resolution of 500 Hz, 250 Hz and 125 Hz, respectively.

Figure 5:
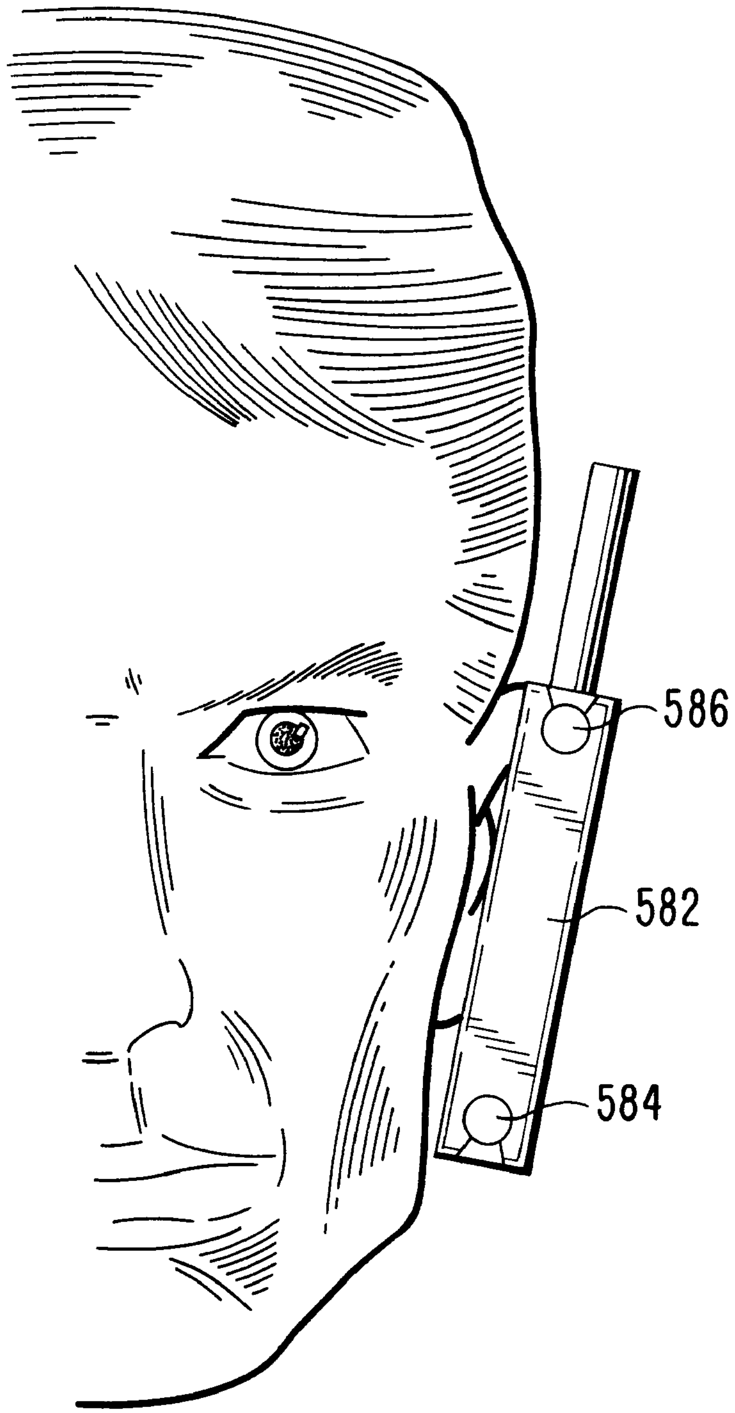
FIG. 5 depicts the placement of near- and far-mouth microphones in an exemplary embodiment of the present invention.

In order to use the above techniques of spectral subtraction in a system where the noise is variable, such as in a mobile telephone, the present invention utilizes a two microphone system. The two microphone system is illustrated in FIG. 5, where 582 is a mobile telephone, 584 is a near-mouth microphone, and 586 is a far-mouth microphone. When a far-mouth microphone is used in conjunction with a near-mouth microphone, it is possible to handle non-stationary background noise as long as the noise spectrum can continuously be estimated from a single block of input samples.

The far-mouth microphone 586, in addition to picking up the background noise, also picks up the speaker's voice, albeit at a lower level than the near-mouth microphone 584. To enhance the noise estimate, a spectral subtraction stage is used to suppress the speech in the far-mouth microphone 586 signal. To be able to enhance the noise estimate, a rough speech estimate is formed with another spectral subtraction stage from the near-mouth signal. Finally, a third spectral subtraction stage is used to enhance the near-mouth signal by filtering out the enhanced background noise.

A potential problem with the above technique is the need to make low variance estimates of the filter, i.e., the gain function, since the speech and noise estimates can only be formed from a short block of data samples. In order to reduce the variability of the gain function, the single microphone spectral subtraction algorithm discussed above is used. By doing so, this method reduces the variability of the gain function by using Bartlett's spectrum estimation method to reduce the variance. The frequency resolution is also reduced by this method but this property is used to make a causal true linear convolution. In an exemplary embodiment of the present invention, the variability of the gain function is further reduced by adaptive averaging, controlled by a discrepancy measure between the noise and noisy speech spectrum estimates.

Figure 6:
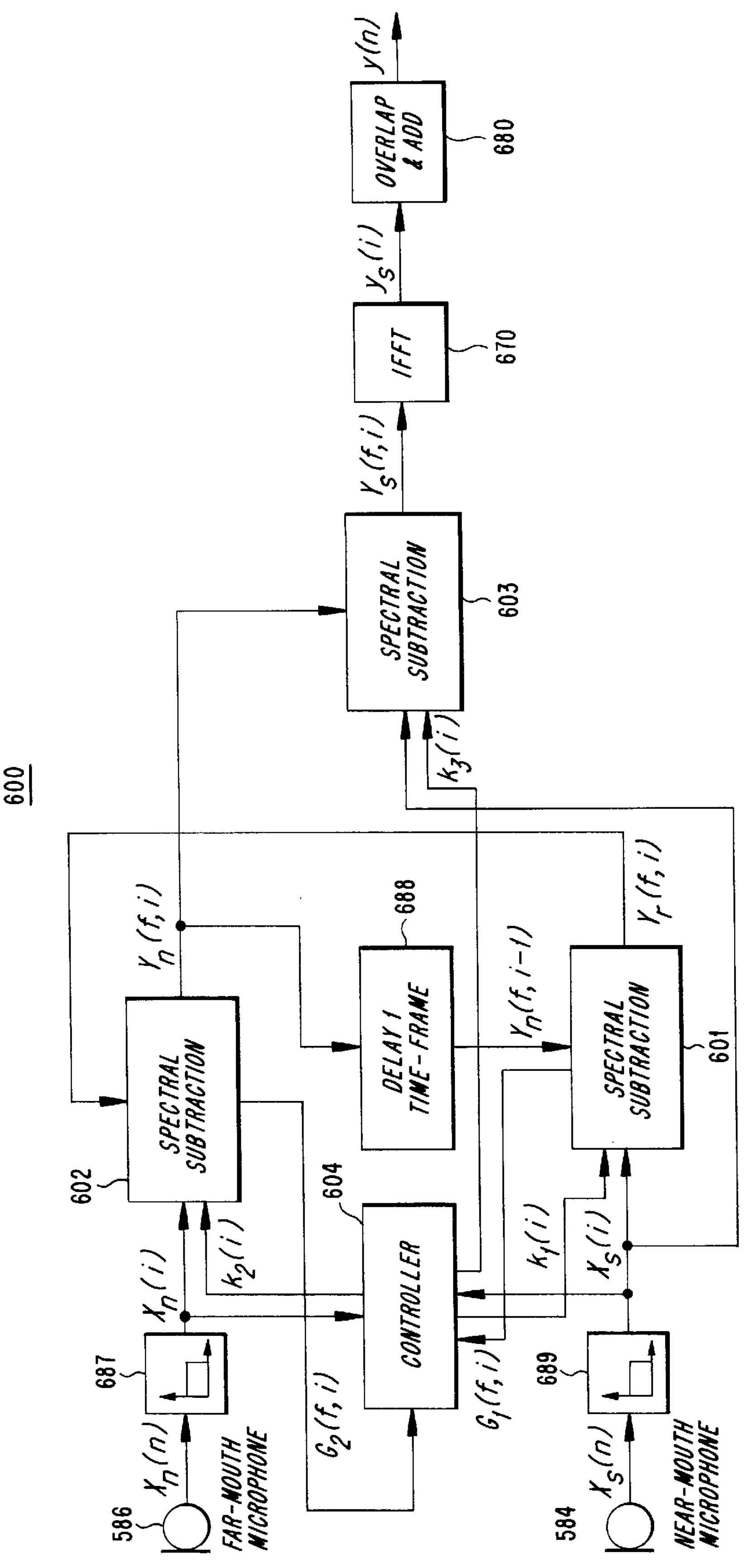
FIG. 6 depicts an exemplary dual microphone spectral subtraction system.

In the two microphone system of the present invention, as illustrated in FIG. 6, there are two signals: the continuous signal from the near-mouth microphone 584, where the speech is dominating, $x_s(n)$; and the continuous signal from the far-mouth microphone 586, where the noise is more dominant, $x_n(n)$. The signal from the near-mouth microphone 584 is provided to an input of a buffer 689 where it is broken down into blocks $x_s(i)$. In an exemplary embodiment of the present invention, buffer 689 is also a speech encoder. The signal from the far-mouth microphone 586 is provided to an input of a buffer 687 where it is broken down into blocks $x_n(i)$. Both buffers 687 and 689 can also include additional signal processing such as an echo canceller in order to further enhance the performance of the present invention. An analog to digital (A/D) converter (not shown) converts an analog signal, derived from the microphones 584, 586, to a digital signal so that it may be processed by the spectral subtraction stages of the present invention. The A/D converter may be present either prior to or following the buffers 687, 689.

The first spectral subtraction stage 601, has as its input, a block of the near-mouth signal, $x_s(i)$, and an estimate of the noise from the previous frame, $Y_n(f,i-1)$. The estimate of noise from the previous frame is produced by coupling the output of the second spectral subtraction stage 602 to the input of a delay circuit 688. The output of the delay circuit 688, is coupled to the first spectral subtraction stage 601. This first spectral subtraction stage is used to make a rough estimate of the speech, $Y_r(f,i)$. The output of the first spectral subtraction stage 601 is supplied to the second spectral subtraction stage 602 which uses this estimate ($Y_r(f,i)$) and a block of the far-mouth signal, $x_n(i)$ to estimate the noise spectrum for the current frame, $Y_n(f,i)$. Finally, the output of the second spectral subtraction stage 602 is supplied to the third spectral subtraction stage 603 which uses the current noise spectrum estimate, $Y_n(f,i)$, and a block of the near-mouth signal, $x_s(i)$, to estimate the noise reduced speech, $Y_s(f,i)$. The output of the third spectral subtraction stage 603 is coupled to an input of the inverse fast Fourier transform processor 670, and an output of the inverse fast Fourier transform processor 670 is coupled to an input of the overlap and add processor 680. The output of the overlap and add processor 680 provides a clean speech signal as an output from the exemplary system 600.

In an exemplary embodiment of the present invention, each spectral subtraction stage 601–603 has a parameter which controls the size of the subtraction. This parameter is preferably set differently depending on the input SNR of the microphones and the method of noise reduction being employed. In addition, in a further exemplary embodiment of the present invention, a controller 604 is used to dynamically set the parameters for each of the spectral subtraction stages 601–603 for further accuracy in a variable noisy environment. In addition, since the far-mouth microphone signal is used to estimate the noise spectrum which will be subtracted from the near-mouth noisy speech spectrum, performance of the present invention will be increased when the background noise spectrum has the same characteristics in both microphones. That is, for example, when using a directional near-mouth microphone, the background characteristics are different when compared to an omni-directional far-mouth microphone. To compensate for the differences in this case, one or both of the microphone signals should be filtered in order to reduce the differences of the spectra.

In an exemplary embodiment of the present invention, it is desirable to keep the delay as low as possible in telephone communications to prevent disturbing echoes and unnatural pauses. When the signal block length is matched with the mobile telephone system's voice encoder block length, the present invention uses the same block of samples as the voice encoder. Thereby, no extra delay is introduced for the buffering of the signal block. The introduced delay is therefore only the computation time of the noise reduction of the present invention plus the group delay of the gain function filtering in the last spectral subtraction stage. As illustrated in the third stage, a minimum phase can be imposed on the amplitude gain function which gives a short delay under the constraint of causal filtering.

Since the present invention uses two microphones, it is no longer necessary to use VAD 330, switch 325, and average block 340 as illustrated with respect to the single microphone use of the spectral subtraction in FIGS. 3 and 4. That is, the far-mouth microphone can be used to provide a constant noise signal during both voice and non-voice time periods. In addition, IFFT 370 and the overlap and add circuit 380 have been moved to the final output stage as illustrated as 670 and 680 in FIG. 6.

Figure 7:
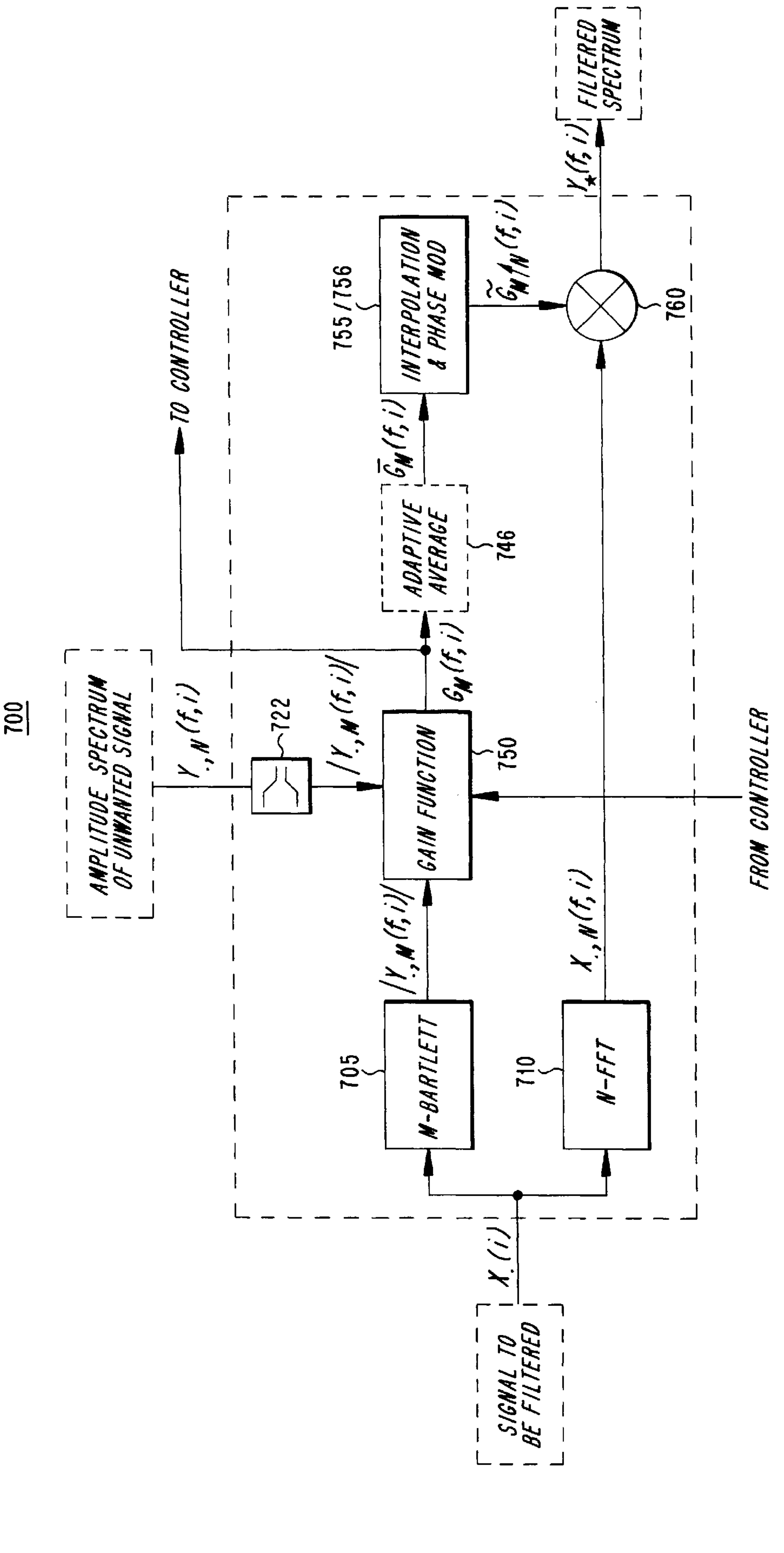
FIG. 7 depicts an exemplary spectral subtraction stage for use in an exemplary embodiment of the present invention.

The above described spectral subtraction stages used in the dual microphone implementation may each be implemented as depicted in FIG. 7. In FIG. 7, a spectral subtraction stage 700, providing linear convolution, causal-filtering and controlled exponential averaging, is shown to include the Bartlett processor 705, the frequency decimator 722, the low order gain computation processor 750, the gain phase processor and the interpolation processor 755/756, and the multiplier 760.

As shown, the noisy speech input signal, $X_{(\cdot)}(i)$, is coupled to an input of the Bartlett processor 705 and to an input of the fast Fourier transform processor 710. The notation $X_{(\cdot)}(i)$ is used to represent $X_n(i)$ or $X_s(i)$ which are provided to the inputs of spectral subtraction stages 601–603 as illustrated in FIG. 6. The amplitude spectrum of the unwanted signal, $Y_{(\cdot,N)}(f,i)$, $Y_{(\cdot)}(f,i)$ with length N, is coupled to an input of the frequency decimator 722. The notation $Y_{(\cdot)}(f,i)$ is used to represent $Y_n(f,i-1)$, $Y_r(f,i)$, or $Y_n(f,i)$. An output of the frequency decimator 722 is the amplitude spectrum of $Y_{(\cdot,N)}(f,i)$ having length M, where M<N. In addition the frequency decimator 722 reduces the variance of the output amplitude spectrum as compared to the input amplitude spectrum. An amplitude spectrum output of the Bartlett processor 705 and an amplitude spectrum output of the frequency decimator 722 are coupled to inputs of the low order gain computation processor 750. The output of the fast Fourier transform processor 710 is coupled to a first input of the multiplier 760.

The output of the low order gain computation processor 750 is coupled to a signal input of an optional exponential averaging processor 746. An output of the exponential averaging processor 746 is coupled to an input of the gain phase and interpolation processor 755/756. An output of processor 755/756 is coupled to a second input of the multiplier 760. The filtered spectrum $Y^*(f,i)$ is thus the output of the multiplier 760, where the notation $Y^*(f,i)$ is used to represent $Y_r(f,i)$, $Y_n(f,i)$, or $Y_s(f,i)$. The gain function used in FIG. 7 is:

$$G_M(f,i) = \left(1 - k_{(\cdot)} \cdot \frac{|Y_{(\cdot),M}(f,i)|^a}{|X_{(\cdot),M}(f,i)|^a}\right)^{\frac{1}{a}} \tag{31}$$

where $|X_{(\cdot),M}(f,i)|$ is the output of Bartlett processor 705, $|Y_{(\cdot),M}(f,i)|$ is the output of the frequency decimator 722, a is a spectrum exponent, $k_{(\cdot)}$ is the subtraction factor controlling the amount of suppression employed for a particular spectral subtraction stage. The gain function can be optionally adaptively averaged. This gain function corresponds to a non-causal time-variating filter. One way to obtain a causal filter is to impose a minimum phase. An alternate way of obtaining a causal filter is to impose a linear phase. To obtain a gain function $G_M(f,i)$ with the same number of FFT bins as the input block $X_{(\cdot),N}(f,i)$, the gain function is interpolated, $G_{M\uparrow N}(f,i)$. The gain function, $G_{M\uparrow N}(f,i)$, now corresponds to a causal linear filter with length M. By using conventional FFT filtering, an output signal without periodicity effects can be obtained.

In operation, the spectral subtraction stage 700 according to the invention processes the incoming noisy speech signal, using the linear convolution, causal filtering and controlled exponential averaging algorithm described above, to provide the improved, reduced-noise speech signal. As with the embodiment of FIGS. 3 and 4, the various components of FIGS. 6–7 can be implemented using any known digital signal processing technology, including a general purpose computer, a collection of integrated circuits and/or application specific integrated circuitry (ASIC).

As discussed above, $k_{(\cdot)}$ is the subtraction factor controlling the amount of suppression employed for a particular spectral subtraction stage. In one embodiment of the present invention, each of the values of $k_{(\cdot)}$ (i.e., $k_1$, $k_2$, $k_3$ where $k_1$ is used by spectral subtraction stage 601, $k_2$ is used by spectral subtraction stage 602, and $k_3$ is used by spectral subtraction stage 603) is dynamically controlled by the controller 604 to compensate for the dynamic nature of the input signals. The controller 604 receives, as an input, the gain functions $G_1$ and $G_2$, from the first and second spectral subtraction stages 601, 602, respectively. In addition, the controller receives $x_s(i)$ and $x_n(i)$ from buffers 689, 687, respectively. Each of the first, second, and third spectral subtraction stages receive, as an input, a control signal from the controller indicating the present value of the respective subtraction factor. The values of $k_{(.)}$ change according to the sound environment. That is, various factors decide the appropriate level of suppression of the background noise and also compensate for the different energy levels of both the background noise and the speech signal in the two microphone signals.

The block-wise energy levels in the microphone signals are denoted by $p_{1,x}(i)$ and $p_{2,x}(i)$ for the near-mouth microphone 584 and the far-mouth microphone 586 signal, respectively. The energy of the speech signal in the near-mouth microphone 584 and the far-mouth microphone 586 signals are respectively denoted by $p_{1,s}(i)$ and $p_{2,s}(i)$ and the corresponding background noise signals energy are denoted by $p_{1,n}(i)$ and $p_{2,n}(i)$.

The subtraction factor is set to the level where the first spectral subtraction function, $SS_1$, results in a speech signal with a low noise level. The parameter $k_1$ must also compensate for energy level differences of the background signal in the two microphone signals. When the background energy level in the far-mouth microphone 586 signal is greater than the level in the near-mouth microphone 584, $k_1$ should decrease, hence $$k_1 \propto \frac{p_{1,n}(i)}{p_{2,n}(i)}. \tag{32}$$

The second spectral subtraction function, $SS_2$, is used to enhance the noise signal in the far-mouth microphone 586 signal. The subtraction factor $k_2$ controls how much of the speech signal should be suppressed. Since the speech signal in the near-mouth microphone 584 signal has a higher energy level than in the secondary microphone signal $k_2$ must compensate for this, hence $$k_2 \propto \frac{p_{2,s}(i)}{p_{1,s}(i)}. \tag{33}$$

The resulting noise estimate should contain a highly reduced speech signal, preferably no speech signal at all, since remains of the desired speech signal will be disadvantageous to the speech enhancement procedure and will thus lower the quality of the output.

The third spectral subtraction function, $SS_3$, is controlled in a similar manner as $SS_1$.

A number of different exemplary control procedures for determining the values of the subtraction factors are described below. Each procedure is described as controlling all the subtraction factors, however, one skilled in the art will recognize that multiple control procedures can be used to jointly derive a subtraction factor level. In addition, different control procedures can be used for the determination of each subtraction factor.

The first exemplary control procedure.makes use of the power or magnitude of the input microphone spectra. The parameters $p_{1,x}(l)$, $p_{2,x}(i)$, $p_{1,s}(i)$, $p_{2,s}(i)$, $p_{1,n}(i)$, and $p_{2,n}(i)$ are defined as above or replaced by the corresponding magnitude estimates.

This procedure is built on the idea of adjusting the energy levels of the speech and noise by means of the subtraction factors. By using the spectral subtraction equation it is possible to derive suitable factors so the energy in the two microphones is leveled.

The subtraction factor in the speech pre-processing spectral subtraction can be derived from $SS_1$ equations $$G_{1,M}(f,i) = \left(1 - k_1 \cdot \frac{\left|\hat{P}_{y_n,M}(f,i-1)\right|^a}{\left|\hat{P}_{x_1,M}(f,i)\right|^a}\right)^{\frac{1}{a}} \quad \text{giving} \tag{35}$$

$$\hat{p}_{1,s}(i) \approx \left(1 - k_1(i) \cdot \frac{\hat{p}_{2,n}(i-1)}{p_{1,x}(i)}\right) \cdot p_{1,x}(i). \tag{36}$$

In equation (36) a=1 and the spectra has been replaced by the energy measures, $\hat{p}_{1,s}$ (i) and $\hat{p}_{2,n}$ (i−1) of the output from the speech and noise pre-processors. Solving the equation for the direct subtraction factor $k_1(i)$ gives $$k_1(i) \approx \frac{p_{1,x}(i) - \hat{p}_{1,s}(i-1)}{\hat{p}_{2,n}(i-1)}. \tag{37}$$

To reduce the iterative coupling in the calculation the equation is restated with the mean of the gain functions $$\tilde{k}_1(i) = \frac{p_{1,x}(i)(1 - \overline{g}_{1,M}(i-1))}{p_{2,x}(i)\overline{g}_{2,M}(i-1)} \cdot t_1 \tag{38}$$

where $t_1$ is a fix multiplication factor setting the overall noise reduction level and $$\overline{g}_{1,M}(i) = \frac{1}{M}\sum_{m=0}^{M-1} G_{1,M}(m,i), \tag{39}$$

$$\overline{g}_{2,M}(i) = \frac{1}{M}\sum_{m=0}^{M-1} G_{2,M}(m,i), \tag{40}$$

Equation (38) is dependent on the ratio of the noise levels in the two microphone signals. Besides $t_1$ equation (38) only compensates for differences in energy between the two microphones. The subtraction factor $\tilde{k}_1$ (i) increases during speech periods. This is suitable behavior since a stronger noise reduction is needed during these periods.

To reduce the variability and to limit $\tilde{k}_1$ to a reasonable range, the averaged subtraction factor is introduced $$\tilde{k}_1(i) = \frac{1}{\rho_1 + 1}\sum_{\delta_1=0}^{\rho_1} \begin{cases} \max_{kI}(i), & \tilde{k}_1(k-\delta_1) > \max_{kI}(i) \\ \tilde{k}_1(i-\delta_1), & \min_{kI} < \tilde{k}_1(i-\delta_1) < \max_{kI}(i) \\ \min_{kI}, & \tilde{k}_1(i-\delta_1) < \min_{kI} \end{cases} \tag{41}$$

where $\rho_1$+1 is the number of averaged subtraction factors, $\min_{k1}$ is the minimum allowed $\overline{k}_1$, and $\max_{k1}(i)$ is the maximum allowed $\overline{k}_1$ calculated by $$\max_{k1}(i) = \min([\overline{k}_1(i), \overline{k}_1(i-1) \ldots, \overline{k}_1(i-\Delta_1)]) + r_1 \tag{42}$$

The maximum $\max_{k1}(i)$ is used to prevent the subtraction level during speech periods from becoming too high, and to decrease the fluctuations of the gain function. The maximum is set by an offset, $r_1$, to the minimum $\overline{k}_1$ (i) found during the last $\Delta_1$ frames. Parameter $\Delta_1$ should be large enough so it will cover part of the last "noise only" period. The averaged subtraction factor is then used in the spectral subtraction equation (35) instead of the direct subtraction factor $k_1$.

The parameter $\tilde{k}_3(f,i)$ is derived in the same way as $\tilde{k}_1$ (i) except that it is calculated for each frequency bin separately followed by a smoothing in frequency.

$$\tilde{k}_3(f,i)=\frac{p_{1,x}(f,i)(1-G_{1,M}(f,i))}{p_{2,x}(f,i)G_{2,M}(f,i)}\cdot t_3, \tag{43}$$

$$\bar{k}_3(f,i)=\frac{1}{\rho_3+1}\sum_{\delta_3=0}^{\rho_3}\begin{cases}\max_{k3}(i), & \tilde{k}_3(f,i-\delta_3)>\max_{k3}(i)\\ \tilde{k}_3(f,i-\delta_3), & \min_{k3}<\tilde{k}_3(f,i-\delta_3)<\max_{k3}(i),\\ \min_{k3}, & \tilde{k}_3(f,i-\delta_3)<\min_{k3}\end{cases} \tag{44}$$

$$\max_{k3}(i)=\min([\tilde{k}_3(f,i),\tilde{k}_3(f,i-1)\ \ldots,\ \tilde{k}_3(f,i-\Delta_3)]+r_3,\ f\in[0,1,\ldots,M-1] \tag{45}$$

where $\tilde{k}_3$ (f, i) is the subtraction factor at discrete frequencies f ∈ [0, 1, . . . , M−1]. Further, $p_{1,x}$(f, i) and $p_{2,x}$(f, i) are the power or magnitude of respective input microphone signals at individual frequency bins. The transfer function between the two microphone signals is frequency dependent. This frequency dependence is varying over time due to movement of, for example, the mobile phone and how it is held. A frequency dependence can also be used for the two first subtraction factors if desired. However, this increases computational complexity.

Even though the subtraction factor is calculated in each frequency band, it is smoothed over frequencies to reduce its variability giving $$\bar{\bar{k}}_3(f,i)=\frac{1}{V}\sum_{v=-\frac{V-1}{2}}^{\frac{V-1}{2}}\bar{k}_3\left([f+v]_0^M,\ i\right) \tag{46}$$

where V is the odd length of the rectangular smoothing window and $[f+v]_O^M$ is an interval restriction of the frequency at 0 respectively M. The subtraction factor $\bar{\bar{k}}_3$ (f, i), smoothed in both frequency and frame directions, is used in the third spectral subtraction equation instead of the direct subtraction factor.

The noise pre-processor subtraction factor is different since it decides the amount of speech signal that should be removed from the far-mouth microphone 586 signal. It can be derived from the spectral subtraction equations $$Y_{n,N}(f,i)=G_{2,M\uparrow N}(f,i)\cdot X_{2,L\uparrow N}(f,i), \tag{47}$$

$$G_{2,M}(f,i)=\left(1-k_2\cdot\frac{|\hat{P}_{yr,M}(f,i)|^a}{|\hat{P}_{x2,M}(f,i)|^a}\right)^{\frac{1}{a}}\ \text{giving} \tag{48}$$

$$\hat{p}_{2,n}(i)\approx\left(1-k_2(i)\cdot\frac{\hat{p}_{1,s}(i)}{p_{2,x}(i)}\right)\cdot p_{2,x}(i) \tag{49}$$

In equation (49), the spectra has been replaced by the energy measures and a=1. Solving the equation for the direct subtraction factor $k_2$(i) gives $$k_2(i)\approx\frac{p_{2,x}(i)-\hat{p}_{2,n}(i-1)}{\hat{p}_{1,s}(i)}\cdot t_2. \tag{50}$$

where an overall speech reduction level, $t_2$, is also introduced. By restating equation (50) without explicitly using the energy of the pre-processed signals, a more robust control is obtained:

$$\tilde{k}_2(i)=\frac{p_{2,x}(i)(1-\bar{g}_{2,M}(i-1))}{p_{1,x}(i)\bar{g}_{1,M}(i)}\cdot t_2. \tag{51}$$

Equation (51) depends on the ratio between the speech levels in the two microphone signals.

To reduce the variability and to limit $\tilde{k}_2$ to an allowed range, an exponentially averaged subtraction factor is introduced $$\bar{k}_2(i)=\beta_2\cdot\bar{k}_2+(1-\beta_2)\cdot\begin{cases}\max_{k2}(i), & \tilde{k}_2(i)>\max_{k2}\\ \tilde{k}_2(i), & \min_{k2}<\tilde{k}_2(i)<\max_{k2}\\ \min_{k2}, & \tilde{k}_2(i)>\min_{k2}\end{cases} \tag{52}$$

where $\beta_2$ is the exponential averaging constant, $\max_{k2}$ is the maximum allowed $\bar{k}_2$ and $\min_{k2}$ is the minimum allowed $\bar{k}_2$. The averaged subtraction factor is then used in the spectral subtraction equation (48) instead of the direct subtraction factor $k_2$.

An alternative exemplary control procedure makes use of the correlation between the two input microphone signals. The input time signal samples are denoted as $x_1$(n) and $x_2$(n) for the near-mouth microphone 584 and far-mouth microphone 596, respectively.

The correlation between the signals is dependent on the degree of similarity between the signals. Generally, the correlation is higher when the user's voice is present. Point-formed background noise sources may have the same effect on the correlation. The correlation matrix is defined as $$R_{x1,x2}(l)=\sum_{n=-\infty}^{\infty}x_1(n+l)\cdot x_2(n) \tag{53}$$

on a signal of infinite duration. In practice, this can be approximated by using only a time-window of the signals $$\tilde{R}_{x1,x2}(i)=\frac{1}{P_1(i)}x_1^T(i)x_2(i) \tag{54}$$

where i is the frame number, $P_1$ is the variance of the primary signal for this frame and $$x_1(i)=\begin{bmatrix}x_1(n-U_0) & x_1(n-U_0+1) & \ldots & x_1(n-U_0+K)\\ x_1(n-U_1) & x_1(n-U_1) & \ldots & x_1(n-U_1+K-1)\\ \ldots & & & \end{bmatrix} \tag{55}$$

and $$x_2^T(i)=[x_2(n)\ x_2(n-1)\ \ldots\ x_2(n-K)]. \tag{56}$$

The parameter U is the set of lags of calculated correlation values and K is the time-window duration in samples.

The estimated correlation measure $\tilde{R}_{x1,x2}$ is used in the calculation of a new correlation energy measure $$\gamma(i)=\sum_{l\in\Omega}\left|\tilde{R}_{x1,x2}(i)[l]\right|^2=\tilde{R}_{x1,x2}^T(i)\tilde{R}_{x1,x2}(i) \tag{57}$$

where Ω defines a set of integers. The use of the square function, as shown in equation (57) is not essential to the invention; other even functions can alternatively be used on the correlation samples. The γ(i) measure is only calculated over the present frame. To improve quality and reduce the fluctuation of the measure, an averaged measure is used $$\bar{\gamma}(i)=\bar{\gamma}(i-1)\cdot\alpha\gamma(i)\cdot(1-\alpha) \quad (58)$$

The exponential averaging constant $\alpha$ is set to correspond to an average over less than 4 frames.

Finally, the subtraction factors can be calculated from the averaged correlation energy measures $$k_1(i)=(1-\bar{\gamma}(i))\cdot t_1+r_1 \quad (59)$$

$$k_2(i)=\bar{\gamma}(i)\cdot t_2+r_2 \quad (60)$$

$$k_3(i)=(1-\bar{\gamma}(i))\cdot t_3+r_3 \quad (61)$$

where $t_1$, $t_2$ and $t_3$ are scalar multiplication factors to adjust the amount of subtraction that is generally used. The parameters $r_1$, $r_2$ and $r_3$ are additive to the correlation energy measure setting a generally lower or higher level of subtraction.

The adaptive frame-per-frame calculated subtraction factors $k_1(i)$, $k_2(i)$ and $k_3(i)$ are used in the spectral subtraction equations.

Another alternative exemplary control procedure uses a fixed level of the subtraction factors. This means that each subtraction factor is set to a level that generally works for a large number of environments.

In other alternative embodiments of the present invention, subtraction factors can be derived from other data not discussed above. For example, the subtraction factors can be dynamically generated from information derived from the two input microphone signals. Alternatively, information for dynamically generating the subtraction factors can be obtained from other sensors, such as those associated with a vehicle hands free accessory, an office hands free-kit, or a portable hands free cable. Still other sources of information for generating the subtraction factors include, but are not limited to, sensors for measuring the distance to the user, and information derived from user or device settings.

In summary, the present invention provides improved methods and apparatuses for dual microphone spectral subtraction using linear convolution, causal filtering and/or controlled exponential averaging of the gain function. One skilled in the art will readily recognize that the present invention can enhance the quality of any audio signal such as music, and the like, and is not limited to only voice or speech audio signals. The exemplary methods handle non-stationary background noises, since the present invention does not rely on measuring the noise on only noise-only periods. In addition, during short duration stationary background noises, the speech quality is also improved since background noise can be estimated during both noise-only and speech periods. Furthermore, the present invention can be used with or without directional microphones, and each microphone can be of a different type. In addition, the magnitude of the noise reduction can be adjusted to an appropriate level to adjust for a particular desired speech quality.

Those skilled in the art will appreciate that the present invention is not limited to the specific exemplary embodiments which have been described herein for purposes of illustration and that numerous alternative embodiments are also contemplated. For example, though the invention has been described in the context of mobile communications applications, those skilled in the art will appreciate that the teachings of the invention are equally applicable in any signal processing application in which it is desirable to remove a particular signal component. The scope of the invention is therefore defined by the claims which are appended hereto, rather than the foregoing description, and all equivalents which are consistent with the meaning of the claims are intended to be embraced therein.

We claim:

1. A noise reduction system, comprising:

a first spectral subtraction processor configured to filter a first signal to provide a first noise reduced output signal, wherein an amount of subtraction performed by the first spectral subtraction processor is controlled by a first subtraction factor, $k_1$;

a second spectral subtraction processor configured to filter a second signal to provide a noise estimate output signal, wherein an amount of subtraction performed by the second spectral subtraction processor is controlled by a second subtraction factor, $k_2$;

a third spectral subtraction processor configured to filter said first signal as a function of said noise estimate output signal, wherein an amount of subtraction performed by the third spectral subtraction processor is controlled by a third subtraction factor, $k_3$; and a controller for dynamically determining at least one of the subtraction factors $k_1$, $k_2$, and $k_3$ during operation of the noise reduction system.

2. The noise reduction system of claim 1, wherein the controller estimates a correlation between the first signal and the second signal.

3. The noise reduction system of claim 2, wherein the controller derives at least one of the first, second, and third subtraction factors, $k_1$, $k_2$, and $k_3$, based on the correlation between the first signal and the second signal.

4. The noise reduction system of claim 3, wherein at least one of the subtraction factors, $k_1$, $k_2$, and $k_3$, is smoothed over time.

5. The noise reduction system of claim 2, wherein the controller estimates a set of correlation samples of the first signal and the second signal and computes a correlation measurement as a sum of squares of the set of correlation samples.

6. The noise reduction system of claim 5, wherein at least one of the subtraction factors, $k_1$, $k_2$, and $k_3$, is derived from the correlation measurement of the set of correlation samples.

7. The noise reduction system of claim 6, wherein at least one of the subtraction factors, $k_1$, $k_2$, and $k_3$, is smoothed over time.

8. The noise reduction system of claim 2, wherein the controller estimates a set of correlation samples of the first signal and the second signal and computes a correlation measurement as a sum of an even function of the set of correlation samples.

9. The noise reduction system of claim 8, wherein at least one of the subtraction factors, $k_1$, $k_2$, and $k_3$, is derived from the correlation measurement of the set of correlation samples.

10. The noise reduction system of claim 9, wherein at least one of the subtraction factors, $k_1$, $k_2$, and $k_3$, is smoothed over time.

11. The noise reduction system of claim 2, wherein the subtraction factors $k_1$, $k_2$, and $k_3$ are derived as $$k_1(i)=(1-\bar{\gamma}(i))\cdot t_1+r_1$$

$$k_2(i)=\bar{\gamma}(i)\cdot t_2+r_2$$

$$k_3(i)=(1-\bar{\gamma}(i))\cdot t_3+r_3$$

where $t_1$, $t_2$, and $t_3$ are scalar multiplication factors, $r_1$, $r_2$, and $r_3$ are additive factors, and $\bar{\gamma}(i)$ is an averaged square correlation sum of the first signal and the second signal.

12. The noise reduction system of claim 1, wherein the controller substantially equalizes energy levels of the first signal and the second signal.

13. The noise reduction system of claim 1, wherein the controller substantially equalizes magnitude levels of the first signal and the second signal.

14. The noise reduction system of claim 1, wherein the controller derives at least one of the first, second, and third subtraction factors $k_1$, $k_2$, and $k_3$ from a ratio of a noise signal measurement of the first signal and a noise signal measurement of the second signal.

15. The noise reduction system of claim 14, wherein each of the noise signal measurements is an energy measurement.

16. The noise reduction system of claim 14, wherein each of the noise signal measurements is a magnitude measurement.

17. The noise reduction system of claim 14, wherein the controller computes at least one of a first relative positive measurement based on a first gain function and a second relative positive measurement based on a second gain function.

18. The noise reduction system of claim 17, wherein the noise signal measurement is derived from at least one of the first signal and the second signal and at least one of the first relative positive measurement and the second relative positive measurement, respectively.

19. The noise reduction system of claim 14, wherein a frequency dependent weighting function, performed by at least one of the first and second spectral subtraction processors, is used to derive at least one of a first and second frequency dependent positive measurement.

20. The noise reduction system of claim 19, wherein the noise signal measurement is derived from at least one of the first signal and the second signal and at least one of the first frequency dependent positive measurement and the second frequency dependent positive measurement.

21. The noise reduction system of claim 14, wherein the subtraction factors $k_1$, $k_2$, and $k_3$ are derived as:

$$k_1(i) = \frac{p_{1,x}(i)(1 - \overline{g}_{1,M}(i-1))}{p_{2,x}(i)\overline{g}_{2,M}(i-1)} \cdot t_1$$

$$k_2(i) = \frac{p_{2,x}(i)(1 - \overline{g}_{2,M}(i-1))}{p_{1,x}(i)\overline{g}_{1,M}(i)} \cdot t_2.$$

$$k_3(f, i) = \frac{p_{1,x}(f, i)(1\ G_{1,M}(f, i))}{p_{2,x}(f, i)G_{2,M}(f, i)} \cdot t_3, \text{ where}$$

$$\overline{g}_{1,M}(i) = \frac{1}{M}\sum_{m-0}^{M\ 1} G_{1,M}(m, i),$$

$$\overline{g}_{2,M}(i) = \frac{1}{M}\sum_{m-0}^{M\ 1} G_{2,M}(m, i),$$

where $p_{1,x}(i)$ is an energy level of the first signal and $p_{2,x}(i)$ is an energy level of the second signal, $t_1$, $t_2$, and $t_3$ are scalar multiplication factors, $G_1$ is a first gain function, and $G_2$ is a second gain function.

22. The noise reduction system of claim 1, wherein the controller derives at least one of the first, second, and third subtraction factors $k_1$, $k_2$, and $k_3$ from a ratio of a desired signal measurement of the second signal and a desired signal measurement of the first signal.

23. The noise reduction system of claim 22, wherein each of the desired signal measurements is an energy measurement.

24. The noise reduction system of claim 22, wherein each of the desired signal measurements is a magnitude measurement.

25. The noise reduction system of claim 22, wherein the desired signal measurement is a speech signal measurement.

26. The noise reduction system of claim 22, wherein the controller computes at least one of a first relative positive measurement based on a first gain function and a second relative positive measurement based on a second gain function.

27. The noise reduction system of claim 26, wherein the desired signal measurement is derived from at least one of the first signal and the second signal and at least one of the first relative positive measurement and the second relative positive measurement, respectively.

28. The noise reduction system of claim 22, wherein a frequency dependent weighting function, performed by at least one of the first and second spectral subtraction processors, is used to derive at least one of a first and second frequency dependent positive measurement.

29. The noise reduction system of claim 28, wherein the desired signal measurement is derived from at least one of the first signal and the second signal and at least one of the first frequency dependent positive measurement and the second frequency dependent positive measurement.

30. The noise reduction system of claim 22, wherein the subtraction factors $k_1$, $k_2$, and $k_3$ are derived as:

$$k_1(i) = \frac{p_{1,x}(i)(1 - \overline{g}_{1,M}(i-1))}{p_{2,x}(i)\overline{g}_{2,M}(i-1)} \cdot t_1$$

$$k_2(i) = \frac{p_{2,x}(i)(1 - \overline{g}_{2,M}(i-1))}{p_{1,x}(i)\overline{g}_{1,M}(i)} \cdot t_2.$$

$$k_3(f, i) = \frac{p_{1,x}(f, i)(1\ G_{1,M}(f, i))}{p_{2,x}(f, i)G_{2,M}(f, i)} \cdot t_3, \text{ where}$$

$$\overline{g}_{1,M}(i) = \frac{1}{M}\sum_{m-0}^{M\ 1} G_{1,M}(m, i),$$

$$\overline{g}_{2,M}(i) = \frac{1}{M}\sum_{m-0}^{M\ 1} G_{2,M}(m, i),$$

where $p_{1,x}(i)$ is a magnitude level of the first signal and $p_{2,x}(i)$ is a magnitude level of the second signal, $t_1$, $t_2$, and $t_3$ are scalar multiplication factors, $G_1$ is a first gain function, and $G_2$ is a second gain function.

31. A method for processing a noisy input signal and a noise signal to provide a noise reduced output signal, comprising the steps of:

(a) using spectral subtraction to filter said noisy input signal to provide a first noise reduced output signal, wherein an amount of subtraction performed is controlled by a first subtraction factor, $k_1$;

(b) using spectral subtraction to filter said noise signal to provide a noise estimate output signal, wherein an amount of subtraction performed is controlled by a second subtraction factor, $k_2$; and (c) using spectral subtraction to filter said noisy input signal as a function of said noise estimate output signal, wherein an amount of subtraction performed is controlled by a third subtraction factor, $k_3$, wherein at least one of the first, second, and third subtraction factors is dynamically determined during the processing of the noisy input signal and the noise signal.

32. The method of claim 31, wherein a correlation between the noisy input signal and the noise signal is estimated.

33. The method of claim 32, wherein at least one of the first, second, and third subtraction factors, $k_1$, $k_2$, and $k_3$, is based on the correlation between the noisy input signal and the noise signal.

34. The method of claim 33, wherein at least one of the subtraction factors, $k_1$, $k_2$, and $k_3$, is smoothed over time.

35. The method of claim 32, wherein a set of correlation samples of the noisy input signal and the noise signal are estimated and a correlation measurement as a sum of squares of the set of correlation samples is computed.

36. The method of claim 35, wherein at least one of the subtraction factors, $k_1$, $k_2$, and $k_3$, is derived from the correlation measurement of the set of correlation samples.

37. The method of claim 36, wherein at least one of the subtraction factors, $k_1$, $k_2$, and $k_3$, is smoothed over time.

38. The method of claim 32, wherein a set of correlation samples of the noisy input signal and the noise signal are estimated and a correlation measurement as a sum of an even function of the set of correlation samples is computed.

39. The method of claim 38, wherein at least one of the subtraction factors, $k_1$, $k_2$, and $k_3$, is derived from the correlation measurement of the set of correlation samples.

40. The method of claim 39, wherein at least one of the subtraction factions, $k_1$, $k_2$, $k_3$, is smoothed over time.

41. The method of claim 32, wherein the subtraction factors $k_1$, $k_2$, and $k_3$ are derived as $$k_1(i)=(1-\bar{\gamma}(i))\cdot t_1+r_1$$

$$k_2(i)=\bar{\gamma}(i)\cdot t_2+r_2$$

$$k_3(i)=(1-\bar{\gamma}(i))\cdot t_3+r_3$$

where $t_1$, $t_2$, and $t_3$ are scalar multiplication factors, $r_1$, $r_2$, and $r_3$ are additive factors, and $\bar{\gamma}(i)$ is an averaged squared correlation sum of the noisy input signal and the noise signal.

42. The method of claim 31, wherein energy levels of the noisy input signal and the noise signal are substantially equalized.

43. The method of claim 31, wherein magnitude levels of the noisy input signal and the noise signal are substantially equalized.

44. The method of claim 31, wherein at least one of the first, second, and third subtraction factors $k_1$, $k_2$, and $k_3$ is derived from a ratio of a noise signal measurement of the noisy input signal and a noise signal measurement of the noise signal.

45. The method of claim 44, wherein each of the noise signal measurements is an energy measurement.

46. The method of claim 44, wherein each of the noise signal measurements is a magnitude measurement.

47. The method of claim 44, wherein at least one of a first relative positive measurement based on a first gain function and a second relative positive measurement based on a second gain function is computed.

48. The method of claim 47, wherein the noise signal measurement is derived from at least one of the noisy input signal and the noise signal and at least one of the first relative positive measurement and the second relative positive measurement, respectively.

49. The method of claim 44, wherein a frequency dependent weighting function is used to derive at least one of a first and second frequency dependent positive measurement.

50. The method of claim 49, wherein the noise signal measurement is derived from at least one of the noisy input signal and the noise signal and at least one of the first frequency dependent positive measurement and the second frequency dependent positive measurement.

51. The method of claim 44, wherein the subtraction factors $k_1$, $k_2$, and $k_3$ are derived as:

$$k_1(i)=\frac{p_{1,x}(i)(1-\bar{g}_{1,M}(i-1))}{p_{2,x}(i)\bar{g}_{2,M}(i-1)}\cdot t_1$$

$$k_2(i)=\frac{p_{2,x}(i)(1-\bar{g}_{2,M}(i-1))}{p_{1,x}(i)\bar{g}_{1,M}(i)}\cdot t_2,$$

$$k_3(f,i)=\frac{p_{1,x}(f,i)(1-G_{1,M}(f,i))}{p_{2,x}(f,i)G_{2,M}(f,i)}\cdot t_3, \text{ where}$$

$$\bar{g}_{1,M}(i)=\frac{1}{M}\sum_{m=0}^{M1}G_{1,M}(m,i),$$

$$\bar{g}_{2,M}(i)=\frac{1}{M}\sum_{m=0}^{M1}G_{2,M}(m,i),$$

where $p_{1,x}(i)$ is an energy level of the noisy input signal and $p_{2,x}(i)$ is an energy level of the noise signal, $t_1$, $t_2$, and $t_3$ are scalar multiplication factors, $G_1$ is a first gain function and $G_2$ is a second gain function.

52. The method of claim 31, wherein at least one of the first, second, and third subtraction factors $k_1$, $k_2$, and $k_3$ is derived from a ratio of a desired signal measurement of the noise signal and a desired signal measurement of the noisy input signal.

53. The method of claim 52, wherein each of the desired signal measurements is an energy measurement.

54. The method of claim 52, wherein each of the desired signal measurements is a magnitude measurement.

55. The method of claim 52, wherein the desired signal is a speech signal.

56. The method of claim 52, wherein at least one of a first relative positive measurement based on a first gain function and a second relative positive measurement based on a second gain function is computed.

57. The method of claim 56, wherein the desired signal measurement is derived from at least one of the noisy input signal and the noise signal and at least one of the first relative positive measurement and the second relative positive measurement, respectively.

58. The method of claim 52, wherein a frequency dependent weighting function is used to derive at least one of a first and second frequency dependent positive measurement.

59. The method of claim 58, wherein the noise signal measurement is derived from at least one of the noisy input signal and the noise signal and at least one of the first frequency dependent positive measurement and the second frequency dependent positive measurement.

60. The method of claim 52, wherein the subtraction factors $k_1$, $k_2$, and $k_3$ are derived as:

$$k_1(i)=\frac{p_{1,x}(i)(1-\bar{g}_{1,M}(i-1))}{p_{2,x}(i)\bar{g}_{2,M}(i-1)}\cdot t_1$$

$$k_2(i)=\frac{p_{2,x}(i)(1-\bar{g}_{2,M}(i-1))}{p_{1,x}(i)\bar{g}_{1,M}(i)}\cdot t_2,$$

$$k_3(f,i)=\frac{p_{1,x}(f,i)(1-G_{1,M}(f,i))}{p_{2,x}(f,i)G_{2,M}(f,i)}\cdot t_3, \text{ where}$$

$$\bar{g}_{1,M}(i)=\frac{1}{M}\sum_{m=0}^{M1}G_{1,M}(m,i),$$

$$\bar{g}_{2,M}(i)=\frac{1}{M}\sum_{m=0}^{M1}G_{2,M}(m,i),$$

where $p_{1,x}(i)$ is a magnitude level of the noisy input signal and $p_{2,x}(i)$ is a magnitude level of the noise signal, $t_1$, $t_2$, and $t_3$ are scalar multiplication factors, $G_1$ is a first gain function and $G_2$ is a second gain function.

* * * * *